(12) United States Patent
Hojo (10) Patent No.: US 7,726,884 B2
(45) Date of Patent: Jun. 1, 2010

(54) SUPPORT STRUCTURE FOR ROTATION BODY

(75) Inventor: Katsuyuki Hojo, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1001 days.

(21) Appl. No.: 11/237,770

(22) Filed: Sep. 29, 2005

(65) Prior Publication Data

US 2006/0098909 A1 May 11, 2006

(30) Foreign Application Priority Data

Nov. 5, 2004 (JP) .............................. 2004-322979

(51) Int. Cl.
*F16C 23/10* (2006.01)
(52) U.S. Cl. ...................................... 384/563
(58) Field of Classification Search ................ 384/517, 384/518, 563, 571
See application file for complete search history.

(56) References Cited

U.S. PATENT DOCUMENTS

| | | | |
|---|---|---|---|
| 4,023,868 A * | 5/1977 | Miki | 384/563 |
| 4,033,644 A | 7/1977 | Reneerkens | |
| 4,363,608 A | 12/1982 | Mulders | |
| 4,611,935 A * | 9/1986 | Rode | 384/548 |
| 5,316,393 A * | 5/1994 | Daugherty | 384/517 |
| 5,624,345 A | 4/1997 | Graft et al. | |

FOREIGN PATENT DOCUMENTS

| | | |
|---|---|---|
| DE | 195 17 955 A1 | 11/1995 |
| GB | 25 32 370 | 1/1977 |
| JP | 58-144135 | 9/1983 |
| JP | 02273047 | 11/1990 |
| JP | 04000030 | 1/1992 |
| JP | 7-208459 | 8/1995 |
| JP | 7-332359 | 12/1995 |
| JP | 2002339965 | 11/2002 |
| JP | 2003214450 | 7/2003 |
| JP | 2003-343692 | 12/2003 |
| JP | 2005080339 | 3/2005 |

* cited by examiner

*Primary Examiner*—Thomas R Hannon
*Assistant Examiner*—James Pilkington
(74) *Attorney, Agent, or Firm*—Oblon, Spivak, McClelland, Maier & Neustadt, L.L.P.

(57) ABSTRACT

A differential device includes a differential case which is supported in a housing so as to be rotatable around an axis of the housing by a conical roller bearing including plural conical rollers provided between an outer race and an inner race. In the differential device, a wave spring having a predetermined elastic force is provided between the outer race and the housing. Also, the differential device includes a stopper mechanism which stops movement of the outer race before the wave spring is completely contracted due to movement of the outer race in an axial direction.

11 Claims, 9 Drawing Sheets

SUPPORT STRUCTURE FOR ROTATION BODY

INCORPORATION BY REFERENCE

The disclosure of Japanese Patent Application No. 2004-322979 filed on Nov. 5, 2004 including the specification, drawings and abstract is incorporated herein by reference in its entirety.

BACKGROUND OF THE INVENTION

1. Field of the Invention

The invention relates to a support structure for a rotation body provided in a vehicle.

2. Description of the Related Art

In a vehicle, various rotation bodies are provided. Such a rotation body is supported in a housing so as to be rotatable around an axis of the housing by a rolling bearing including plural rolling elements provided between an outer race and an inner race. One example of the rotation body is a differential case provided in a differential device. As the rolling bearing, a conical roller bearing or an angular ball bearing is used. An appropriate preload needs to be applied to the conical roller bearing or the angular ball bearing in order (1) to position the rotation body in a radial direction and in an axial direction, (2) to provide sufficient rigidity of the bearing, and (3) to prevent vibration and resonance in the axial direction and the radial direction, and abnormal noise.

A method of adjusting the preload is well known, in which a shim is provided between the outer race of the bearing and the housing. There are variations in a space between the outer race of the bearing and the housing, due to machining tolerances of the outer race and the housing. Therefore, in the case where the preload is adjusted by providing the shim between the outer race of the bearing and the housing, several kinds of shims having different thicknesses are prepared, and a shim which is appropriate for the actual space between the outer race of the bearing and the housing is selected among the prepared several kinds of shims.

In this method, several kinds of shims need to be prepared. In addition, size of the space needs to be measured and the optimal shim needs to be selected in an assembly process. Therefore, a large number of components need to be prepared, and it takes much time to perform the assembly process.

For example, Japanese Patent Application Publication No. JP 2003-343692 A discloses that a disc spring is used, instead of the shim. In the case where the disc spring is used, even if there are variations in the space between the outer race of the bearing and the housing, the disc spring can always fill the space since an axial length of the disc spring can be increased and decreased. Therefore, only one kind of disc spring needs to be prepared, and therefore size of the space does not need to be measured during the assembly process.

However, in the case where the disc spring is used for adjusting the preload as in the Japanese Patent Application Publication No. JP 2003-343692 A, when a driving force is transmitted to the differential case, and accordingly the differential case is moved with respect to the housing in the axial direction, the disc spring may be plastically deformed. As a result, an appropriate preload may not be applied to the bearing. Also, the disc spring has a linear contact with the members between which the disc spring is provided. Therefore, when the differential case is repeatedly moved with respect the housing, the differential case, the housing, and the disc spring may be worn out.

The aforementioned problems may occur not only in the differential device, but also in other rotation bodies to which an appropriate preload needs to be applied, such as a counter shaft.

SUMMARY OF THE INVENTION

In view of the above, it is an object of the invention to provide a support structure for a rotation body, in which an appropriate preload can be applied for a lone period, and wearing of members can be suppressed.

In order to achieve the aforementioned object, a first aspect of the invention relates to a support structure for a rotation body in which a rotation body is supported in a housing so as to be rotatable around an axis of the housing by a rolling bearing including plural rolling elements provided between an outer race and an inner race. In the support structure, a wave spring having a predetermined elastic force is provided between the outer race and the housing. The support structure also includes a stopper mechanism which stops movement of the outer race before the wave spring is completely contracted due to movement of the outer race in an axial direction.

According to a first aspect of the invention, since the preload is applied to the rolling bearing due to an urging force of the wave spring, a shim for adjusting a preload is not necessary. Accordingly, it is possible to reduce a time required for assembly. Also, since the wave spring has a surface contact with members between which the wave spring is provided, a contact area between the housing and the outer race is large, as compared to a case where a disc spring is used. Therefore, it is possible to suppress wearing of these members. Also, the stopper mechanism prevents the wave spring from being completely contracted. Therefore, the wave spring can be prevented from being plastically deformed. Since the housing and the outer race are prevented from being worn out, and the wave spring is prevented from being plastically deformed, an elastic force for generating the required preload can be maintained for a long period.

Also, the housing may include a stop surface which stops movement of the outer race by contacting a side surface of the outer race, and a ring concave portion which is provided on an outer peripheral side or on an inner peripheral side of the stop surface, and in which the wave spring is housed, the stop surface and the ring concave portion serving as the stopper mechanism. In this case, the stop surface is formed at such a position that an axis length from an end portion of the wave spring on the housing side to the stop surface is longer than a length of the wave spring when the wave spring is completely contracted. According to the aspect of the invention, since a portion of the housing constitutes the stopper mechanism, the number of components can be reduced, and cost can be reduced.

In the first aspect of the invention, a protection member whose hardness is higher than that of the housing may be provided between the housing and an end portion of the wave spring on the housing side. Since the protection member is provided, even when the vehicle is accelerated, decelerated, or moved in a reverse direction plural times, and therefore the wave spring is extended and contracted plural times, stress from the wave spring is transmitted to the housing via the support ring whose hardness is higher than that of the housing. Therefore, it is possible to prevent the stress from being applied to a specific portion of the housing. Accordingly, it is possible to prevent the situation in which high stress is applied to a specific portion of the housing due to operation of the wave spring, and therefore the housing is damaged.

Also, the support structure may include a stopper member which serves as the stopper mechanism. The stopper member includes a stop surface which stops movement of the outer race by contacting a side surface of the outer race, and a ring concave portion which is provided on an outer peripheral side or on an inner peripheral side of the stop surface, in which the wave spring is housed, and whose axial length is longer than a length of the wave spring when the wave spring is completely contracted. In this case, the stopper member is made of a material whose hardness is higher than that of the housing. With this configuration, the shape of the housing is simplified as compared to a case where a portion of the housing constitutes the stopper mechanism. Therefore, it is possible to reduce the number of man-hours required for manufacturing the housing. Also, since the stopper member is made of a material whose hardness is higher than that of the housing, it is possible to prevent the situation in which the high stress is applied to a specific portion of the housing due to operation of the wave spring, and therefore the housing is damaged.

Also, the wave spring may be provided between the rolling bearing that supports one end of the rotation body in the axial direction and the housing, and the wave spring may be provided between the rolling bearing that supports the other end of the rotation body in the axial direction and the housing. In this case, the stopper mechanism is provided for each of the wave springs. Further, the two wave springs are different from each other in at least one of a spring constant and a free length, whereby the stopper mechanism on one side stops movement of the outer race of the rolling bearing on one side by contacting the outer race on the one side while a driving force is not being transmitted to the rotation body. With this configuration, even while the driving force is not being transmitted to the rotation body, a position of the rotation body with respect to the housing is made stable.

Also, the outer race may be fitted into the housing such that the outer race is not moved by an urging force of the wave spring at ordinary temperatures, and when a temperature is increased while a vehicle is running, the outer race is moved with respect to the housing by the urging force of the wave spring. With this configuration, it is possible to appropriately prevent the preload from being released.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF THE EXEMPLARY EMBODIMENTS

Figure 1:
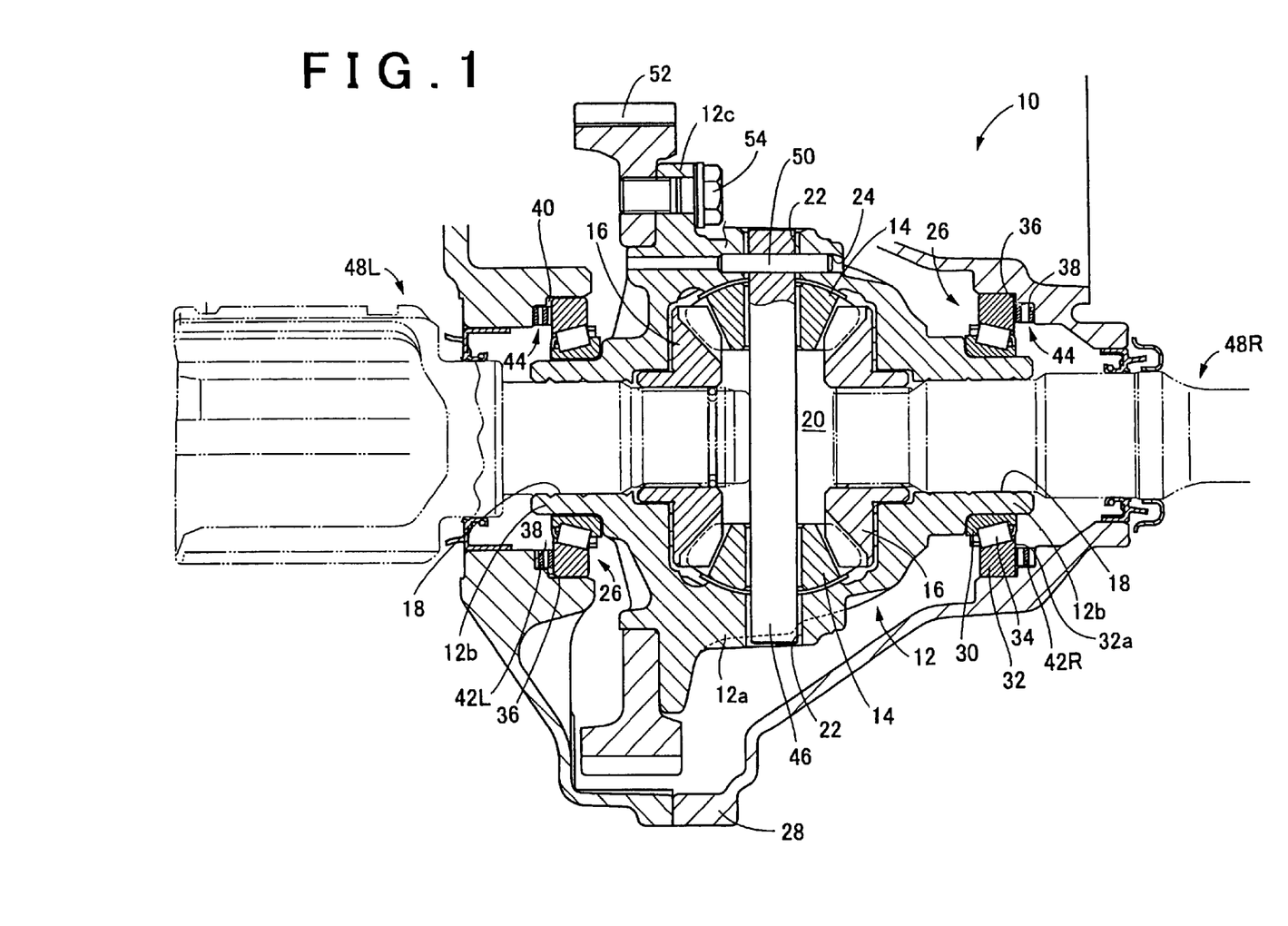
FIG. 1 is a sectional view showing a differential device according to a first embodiment of the invention.

Hereinafter, a first embodiment of the invention will be described in detail with reference to the drawings. FIG. 1 is a sectional view showing a differential device 10 according to the first embodiment of the invention. The differential device 10 is appropriately used in a front engine front drive vehicle. FIG. 1 shows the differential device 10 during acceleration, or during no-load operation.

The differential device 10 includes a differential case 12 made of cast iron, which serves as the rotation body. The differential case 12 includes a main body portion 12a, paired cylinder portions 12b and a protruding portion 12c. Paired pinion gears 14, paired side gears 16, and the like are housed in the differential case 12. The paired cylinder portions 12b protrude from both sides of a main body portion 12a having a box shape. The paired cylinder portions 12b have the same axis. A fitting hole 18 is formed in an inner peripheral surface of the cylinder portion 12b. The protruding portion 12c protrudes from the main body portion 12a in a direction perpendicular to an axis of the fitting hole 18.

In the main body portion 12a of the differential case 12, an accommodation chamber 20 is formed. In the accommodation chamber 20, the pinion gears 14, and the side gears 16, and the like are housed. The accommodation chamber 20 is connected to the fitting hole 18. Also, in the main body portion 12a, paired communication holes 22 and a pin insertion hole 24 are formed. The paired communication holes 22 have an axis in common, and the axis is orthogonal to the axis of the fitting hole 18. The paired communication holes 22 are connected to the accommodation chamber 20. The pin insertion hole 24 is orthogonal to one of the paired communication holes 22 on the protruding portion 12c side. The pin insertion hole 24 penetrates the main body portion 12a.

The differential case 12 thus configured is supported so as to be rotatable with respect to a housing 28 made of aluminum alloy using paired conical roller bearings 26 (i.e., rolling bearings). One of the paired conical roller bearings 26 is provided in an outer periphery of one of the paired cylinder portions 12b of the differential case 12. The other of the paired conical roller bearings 26 is provided in an outer periphery of the other of the paired cylinder portions 12b of the differential case 12. Each of the conical roller bearings 26 includes an inner race 30, an outer race 32, and plural conical rollers 34 (i.e., rolling elements). The inner race 30 is fitted to an outer periphery of the cylinder portion 12b. The outer race 32 is fitted in the housing 28. The plural conical rollers 34 are provided between the inner race 30 and the outer race 32.

In the housing 28, paired stop surfaces 36 and paired ring concave portions are formed. Each of the stop surfaces 36 stops movement of the corresponding outer race 32 by contacting an outer side surface 32a of the outer race 32 (i.e., a side surface on a side opposite to the other outer race 32). Each of the paired ring concave portions is adjacent to an inner peripheral side of the stop surface 36, and is recessed toward an outer side in the axial direction (i.e., a side remote from the outer race 32). Also, a clearance 40 is formed between the stop surface 36 on one side and the corresponding outer race 32 while the stop surface 36 on the other side stops movement of the outer race 32 on the other side by contacting the outer race 32. A wave spring 42R is housed in one of the paired ring concave portions 38. A wave spring 42L is housed in the other of the paired ring concave portions 38. One end of each of the wave springs 42R and 42L contacts the outer side surface 32a of the outer race 32 on one side. Thus, each of the wave springs 42R and 42L urges the outer race 32 on one side toward the outer race 32 on the other side. An axial length of each of the ring concave portions 38 is longer than an axial length of each of the wave springs 42R and 42L housed in the ring concave portions 38 when each of the wave springs 42R and 42L is completely contracted. The aforementioned portion of the housing 28, that is, the stop surface 36 and the ring concave portion 38 constitute a stopper mechanism 44.

Figure 6:
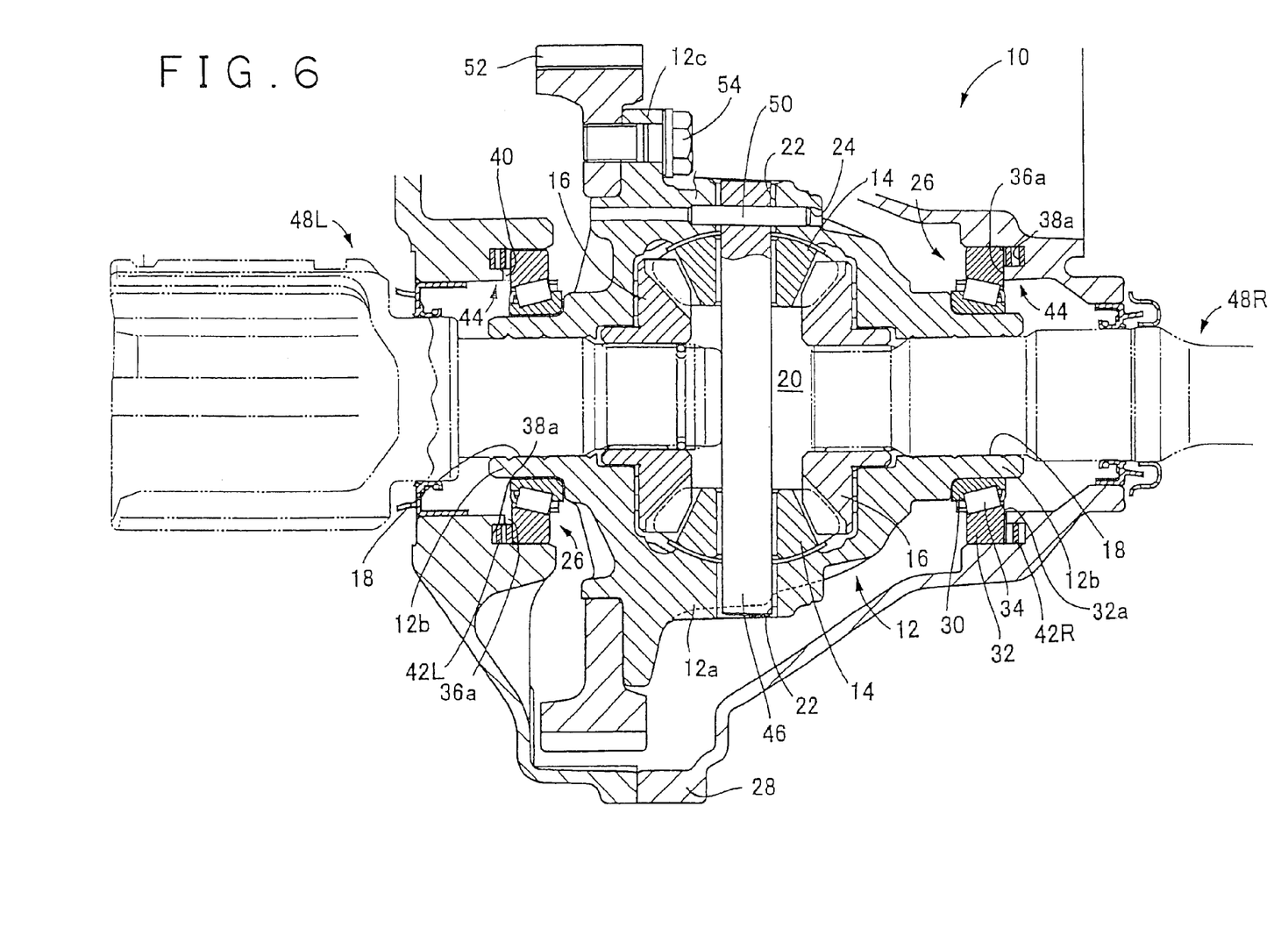
FIG. 6 is a sectional view showing a differential device according to a variation of the first embodiment of the invention.

In another variant, illustrated in FIG. 6, paired stop surfaces 36a and paired ring concave portions 38a are formed in a housing 28. Each of the paired ring concave portions 38a is adjacent to an outer peripheral side of a stop surface 36a, and is recessed toward an outer side in the axial direction (i.e., a side remote from the outer race 32).

Figure 2:
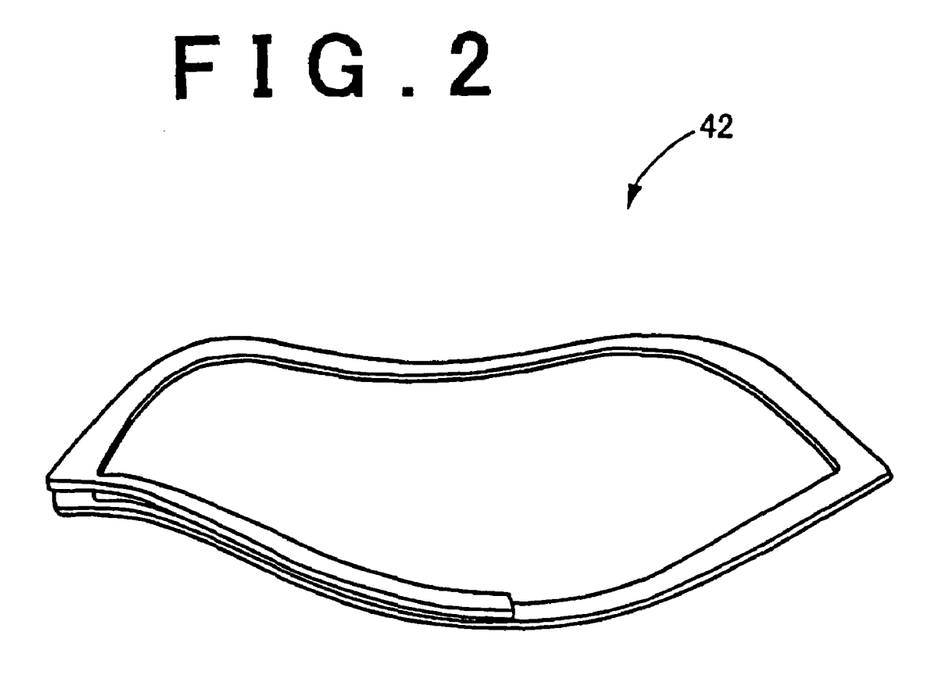
FIG. 2 is a perspective view showing an example of a wave spring shown in FIG. 1.

FIG. 2 is a perspective view showing an example of the aforementioned wave spring 42. As shown in FIG. 2, the wave spring 42 has a gentle wave shape that is continuous in a circumferential direction. The wave spring 42 has a surface contact with the members between which the wave spring 42 is provided, that is, the outer race 32 and the housing 28.

Referring to FIG. 1 again, both of the paired outer races 32 are lightly pressed into the housing 28. As a result, the paired outer races 32 are not moved in the axial direction by urging forces of the wave springs 42R and 42L at ordinary temperatures. However, when a temperature of the housing 28 is increased to, for example, 80 to 100° C. and the housing 28 is expanded while the vehicle is running, the outer races 32 are moved in the axial direction by the urging forces of the wave springs 42R and 42L.

A small gear shaft 46 penetrates the paired communication holes 22 formed in the differential case 12. The paired pinion gears 14 housed in the accommodation chamber 20 are supported by the small gear shaft 46 so as to be rotatable. The paired side gears 16 are engaged with the respective pinion gears 14. The axis of the side gears 16 matches the axis of the fitting hole 18. The drive shafts 48R and 48L extend through the fitting hole 18, and are splined to the inner periphery of the paired side gears 16.

A fixing pin 50 is inserted in the pin insertion hole 24 formed in the differential case 12. The fixing pin 50 penetrates the small gear shaft 46 in the radial direction, and prohibits movement of the small gear shaft 46 in the axial direction. Further, a ring gear 52 contacts one side surface (a left side surface in FIG. 1) of the protruding portion 12c of the differential case 12 such that the ring gear 52 is concentric with the side gears 16. The ring gear 52 is fixed to the differential case 12 by a bolt 54. The ring gear 52 is engaged with a differential drive gear 85 (refer to FIG. 5). The differential drive gear 85 is integrally rotated with a counter shaft 80 (refer to FIG. 5) that serves as an output shaft of an automatic transmission. When the ring gear 52 is rotated by the differential drive gear 85, the differential case 12 that is integrated with the ring gear 52 by the bolt 54 is rotated around the axis of the side gears 16. A rotational driving force of the differential case 12 is transmitted to the side gears 16 via the pinion gears 14, while torque is distributed to the side gears 16.

The ring gear 52 is a helical gear. While the vehicle is accelerated, an axial direction force toward the right in FIG. 1 is applied to the differential case 12 due to engagement of the ring gear 52 with the differential drive gear 85. Therefore, as shown in FIG. 1, the stop surface 36 stops movement of the outer race 32 on the right side in FIG. 1 by contacting the outer race 32. At this time, the wave spring 42R is contracted. Since the axial length of the ring concave portion 38 in which the wave spring 42R is housed is longer than the axial length of the wave spring 42R when the wave spring 42R is completely contracted, the wave spring 42R is prevented from being plastically deformed. Also, at this time, the outer race 32 on the other side is pushed by the wave spring 42L and is moved in the axial direction. Therefore, the preload applied to the conical roller bearing 26 on the wave spring 42L side is prevented from being released.

Meanwhile, while the vehicle is decelerated or the vehicle backs up, since an axial direction force toward the left side in FIG. 1 is applied to the differential case 12, the stop surface 36 stops movement of the outer race 32 on the left side in FIG. 1 by contacting the outer race 32. At this time, the wave spring 42L is contracted. Since the axial length of the ring concave portion 38 in which the wave spring 42L is housed is longer than the axial length of the wave spring 42L when the wave spring 42L is completely contracted, the wave spring 42L is prevented from being plastically deformed. Also, at this time, the outer race 32 on the right side in FIG. 1 is pushed by the wave spring 42R and is moved in the axial direction. Therefore, the preload applied to the conical roller bearing 26 on the wave spring 42R side is prevented from being released.

A spring constant and a free length of each of the wave springs 42R and 42L is set such that an appropriate preload in a predetermined range can be applied to the conical roller bearing 26 in a case where the clearance 40 that is set considering a difference between a coefficient of linear expansion of the housing 28 and that of the differential case 12 is in a predetermined tolerance range. Also, in this embodiment, the free length of the wave spring 42L on the left side in FIG. 1 is longer than that of the wave spring 42R on the right side in FIG. 1. The urging force of the wave spring 42L on the left side in FIG. 1 is set so as to be constantly larger than the urging force of the wave spring 42R on the right side in FIG. 1, irrespective of displacement of the wave springs 42R and 42L. Therefore, when the temperature of the housing 28 is increased, that is, when the outer race 32 becomes movable in the axial direction due to the urging force of the wave spring 42, even if a driving force is not being transmitted to the differential case 12, the differential case 12 and the ring gear 52 that is integrated with the differential case 12 by the bolt 54 are moved to a position at which the stop surface 36 stops movement of the outer race on one side by contacting the outer race, as shown in FIG. 1. Therefore, an engagement position of the ring gear 52 is made stable.

As described above, according to this embodiment, since the preload is applied to the conical roller bearing 26 due to the urging force of the wave spring 42, a shim for adjusting a preload can be eliminated. Accordingly, a time required for assembly can be reduced. Also, since the wave spring 42 has a surface contact with the members between which the wave spring 42 is provided, a contact area between the housing 28 and the outer race 32 is large as compared to a case where a disc spring is used. Thus, the housing 28 and the outer race 32 can be prevented from being worn out. Also, the stopper mechanism 44 prevents the wave spring 42 from being completely contracted. Therefore, the wave spring 42 is prevented from being plastically deformed. Since the housing 28 and the outer race 32 are prevented from being worn out, and the wave spring 42 is prevented from being plastically deformed, an elastic force for generating the required preload can be maintained for a long period.

Also, according to this embodiment, since a portion of the housing 28 constitutes the stopper mechanism 44, the number of components can be reduced, and therefore cost can be reduced.

Also, according to this embodiment, the urging force of the wave spring 42L on the left side in FIG. 1 is set so as to be constantly larger than the urging force of the wave spring 42R on the right side in FIG. 1. Therefore, even while the driving force is not being transmitted to the differential case 12, the position of the differential case 12 with respect to the housing 28 is made stable.

Also, according to this embodiment, the outer races 32 are lightly pressed into the housing 28. As a result, the outer races 32 are not moved by the urging forces of the wave springs 42R and 42L at ordinary temperatures. However, when the temperature of the housing 28 is increased while the vehicle is running, the outer races 32 are moved with respect to the housing 28 by the urging force of the wave springs 42R and 42L. Therefore, the preload is appropriately prevented from being released.

Also, according to this embodiment, the preload is applied to the conic roller bearing 26 by the wave spring 42. Thus, the wave spring 42 can be used in a small space, as compared to the case where a coil spring is used in the conventionally-known method for applying a preload to a bearing. In addition, it is possible to obtain a uniform reaction force on the circumference. Also, it is possible to employ a wide range of designs using a low spring constant to a high spring constant that cannot be provided by a disc spring.

Next, a second embodiment of the invention will be described. In the following description, portions having the same configurations as in the first embodiment will be denoted by the same reference numerals, and description thereof will be omitted.

Figure 3:
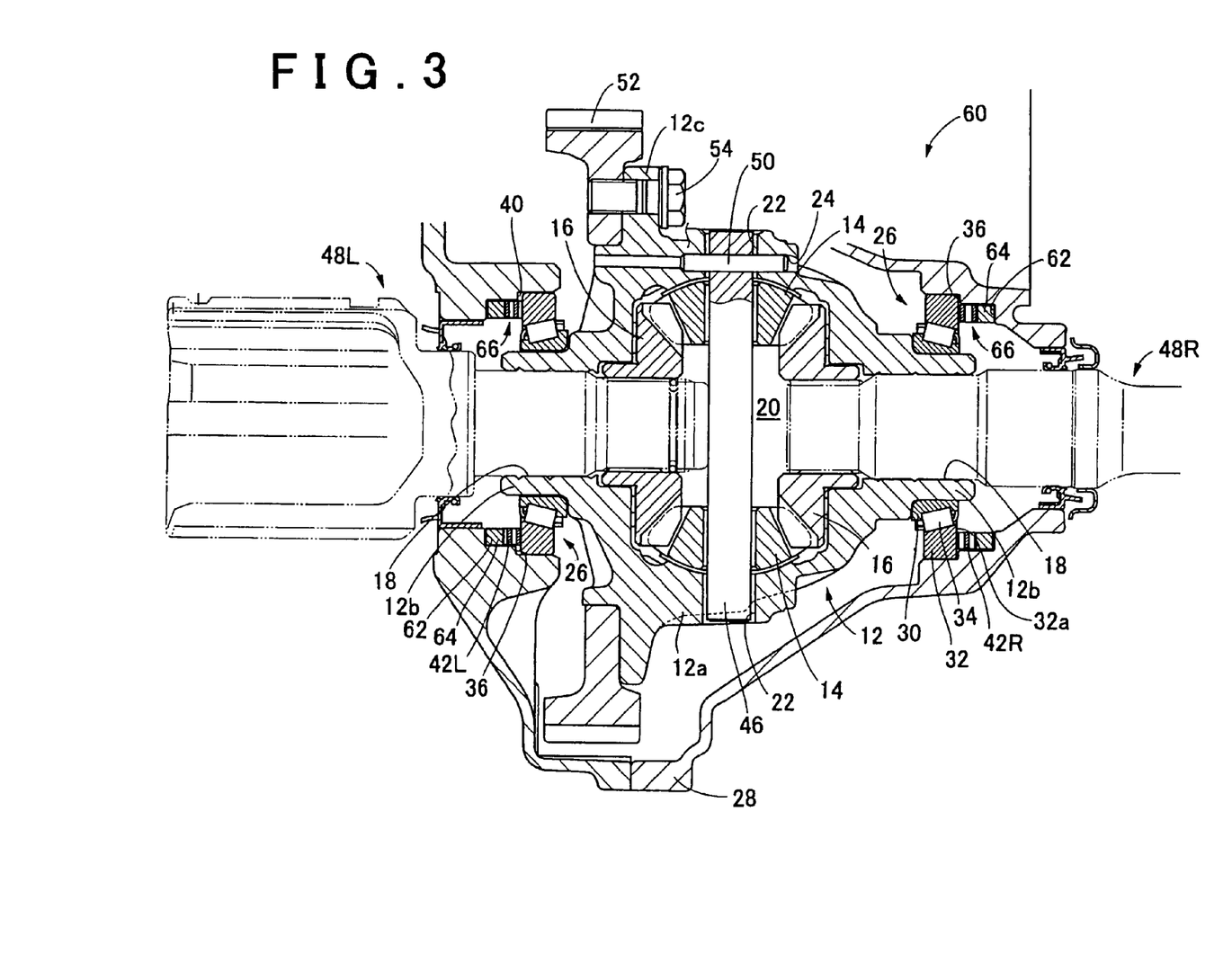
FIG. 3 is a sectional view showing a differential device according to a second embodiment of the invention.

FIG. 3 is a sectional view showing a differential device 60 according to a second embodiment of the invention. This differential device 60 is different from the differential device 10 in the first embodiment only in that the axial length of each of ring concave portions 62 is longer than that of the ring concave portion 38 in the first embodiment, and a support ring 64 that functions as a protection member is fitted in each ring concave portion 62.

Each support ring 64 is made of a material whose hardness is higher than that of the housing 28, such as carbon steel. One end of the wave spring 42 contacts a side surface of the support ring 64, the side surface being opposite to a side surface which contacts the housing 28. An axial length from the side surface of the support ring 64 on the wave spring 42 side to the stop surface 36 is the same as the axial length of the ring concave portion 38 in the first embodiment. Accordingly, in the second embodiment, the stop surface 36 of the housing 28 and the support ring 64 constitute the stopper mechanism 66.

According to the second embodiment, even when the vehicle is accelerated, decelerated, or moved in a reverse direction plural times, and therefore the wave spring 42 is extended and contracted, stress from the wave spring 42 is transmitted to the housing 28 via the support ring 64 whose hardness is higher than that of the housing 28. Therefore, it is possible to prevent the stress from being applied to a specific portion of the housing 28. Accordingly, it is possible to prevent the situation in which high stress is applied to a specific portion of the housing 28 due to operation of the wave spring 42, and therefore the housing 28 is damaged.

Figure 7:
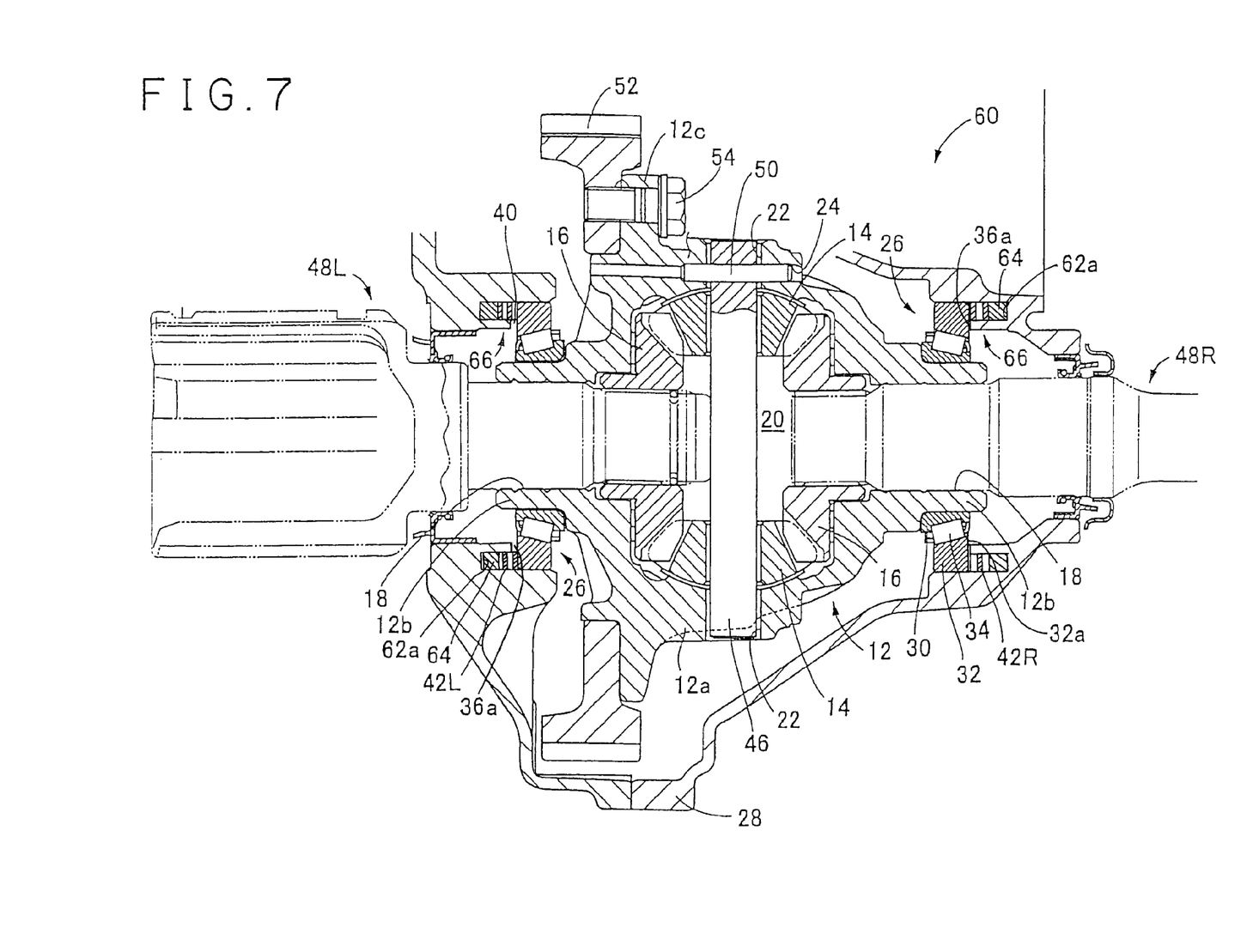
FIG. 7 is a sectional view showing a differential device according to a variation of the second embodiment of the invention.

In another variant, illustrated in FIG. 7, paired ring concave portion 62a are respectively formed adjacent to an outer peripheral side of a stop surface 36a, and are respectively recessed toward an outer side in the axial direction (i.e., a side remote from the outer race 32).

Figure 4:
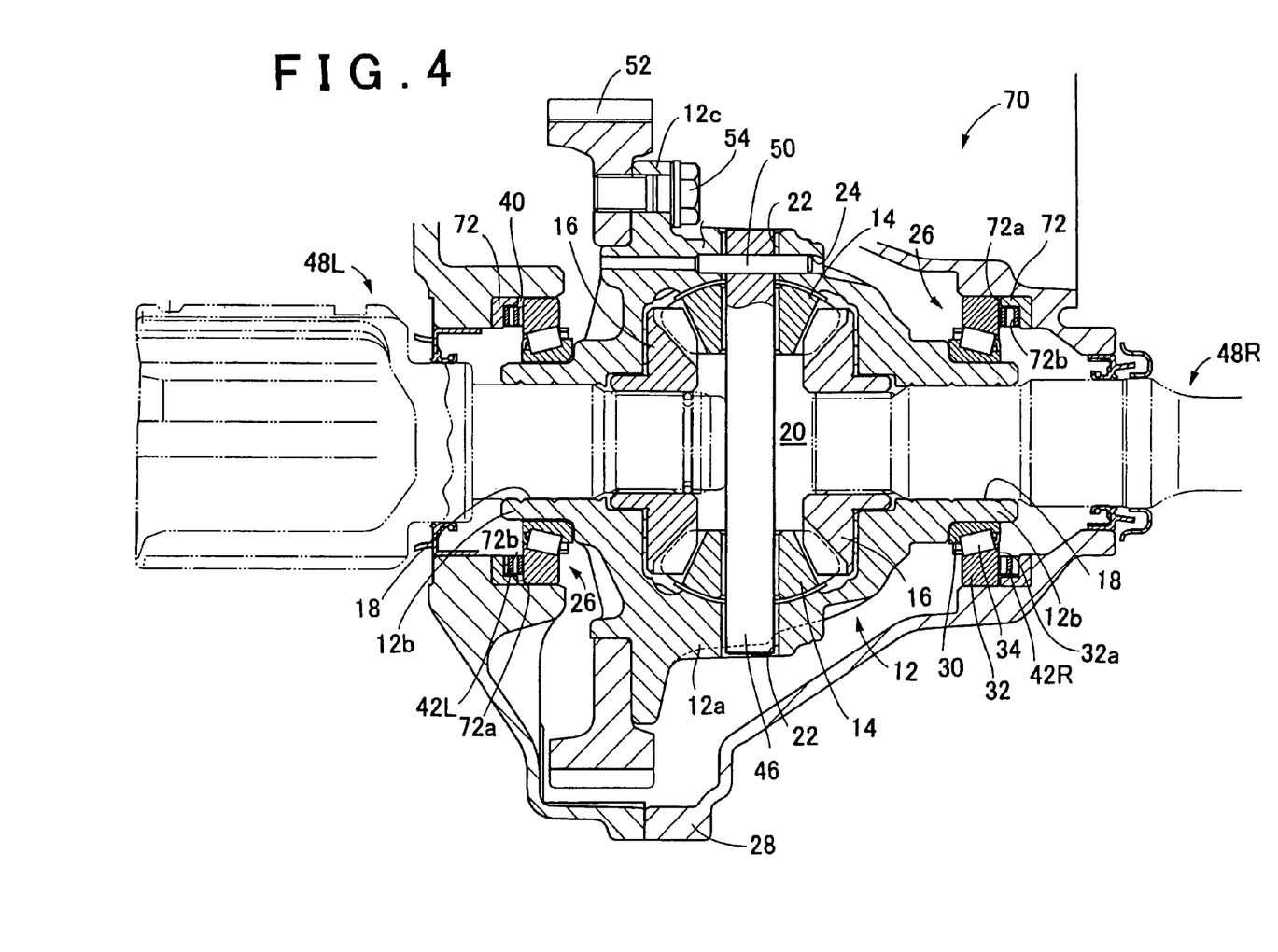
FIG. 4 is a sectional view showing a differential device according to a third embodiment of the invention.

Next, a third embodiment of the invention will be described. FIG. 4 is a sectional view showing a differential device 70 according to a third embodiment of the invention. In the third embodiment, each of paired stopper members 72 is fitted in the housing 28 so as to be adjacent to an outer side of the outer race 32 in the axial direction. Each stopper member 72 has an outer diameter that is substantially the same as that of the outer race 32.

Each stopper member 72 functions as a stopper mechanism and a protection member. The stopper member 72 is made of a material whose hardness is higher than that of the housing 28, such as carbon steel. Each stopper member 72 includes a stop surface 72a, and a ring concave portion 72b. The stop surface 72a stops movement of the outer race 32 by contacting the outer side surface 32a of the outer race 32. Each ring concave portion 72b is adjacent to the inner peripheral side of the stop surface 72a. Each ring concave portion 72b is recessed toward the outer side in the axial direction. Each ring concave portion 72b has the same shape as that of the ring concave portion 38 in the first embodiment. Each of the wave springs 42R and 42L is housed in the corresponding ring concave portion 72b. Also, the clearance 40 is formed between the stop surface 72a of the stopper member 72 on one side and the corresponding outer race 32, while the stop surface 72a on the other side stops movement of the outer race 32 on the other side by contacting the outer race 32, as in the first embodiment.

According to the third embodiment, the shape of the housing 28 is simplified, as compared to the case where a portion of the housing 28 constitutes the stopper mechanism. That is, according to the third embodiment, the stop surface 36 and the ring concave portion 38 in the first embodiment do not need to be formed in the housing 28. Therefore, it is possible to reduce the number of man-hours required for manufacturing the housing 28. Also, since the stopper member 72 is made of a material whose hardness is higher than that of the housing 28, it is possible to prevent the situation in which the high stress is applied to a specific portion of the housing 28 due to operation of the wave spring 42, and therefore the housing 28 is damaged.

Figure 8:
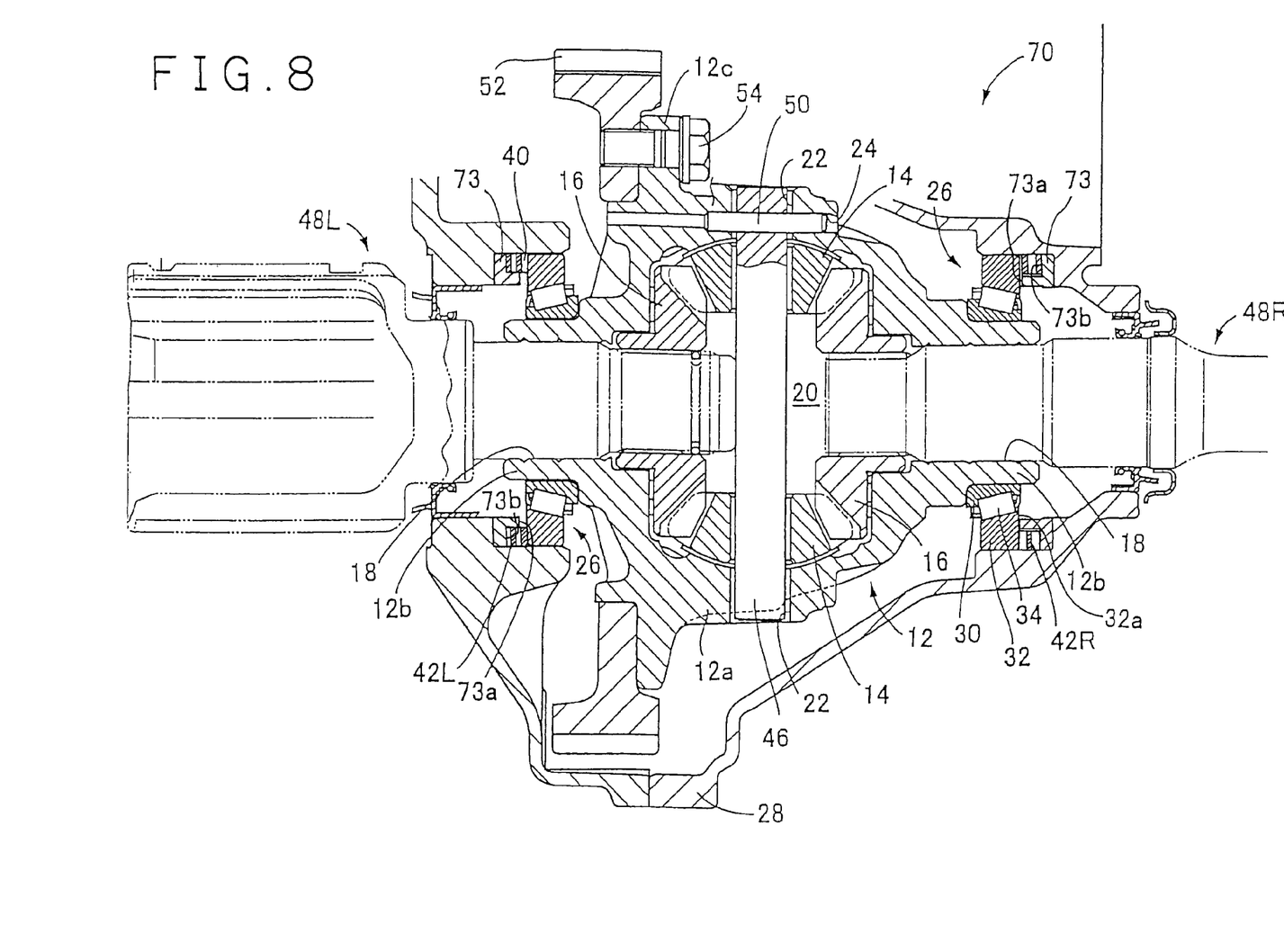
FIG. 8 is a sectional view showing a differential device according to a variation of the third embodiment of the invention.

In another variant, illustrated in FIG. 8, each of paired stopper members 73 is fitted in the housing 28 so as to be adjacent to an outer side of the outer race 32 in the axial direction. Each stopper member 73 includes a stop surface 73a, and a ring concave portion 73b. The stop surface 73a stops movement of the outer race 32 by contacting the outer side surface 32a of the outer race 32. Each ring concave portion 73b is adjacent to the outer peripheral side of the stop surface 73a. Each ring concave portion 73b is recessed toward the outer side in the axial direction. Each ring concave portion 73b has the same shape as that of the ring concave portion 38a in the first embodiment.

Figure 5:
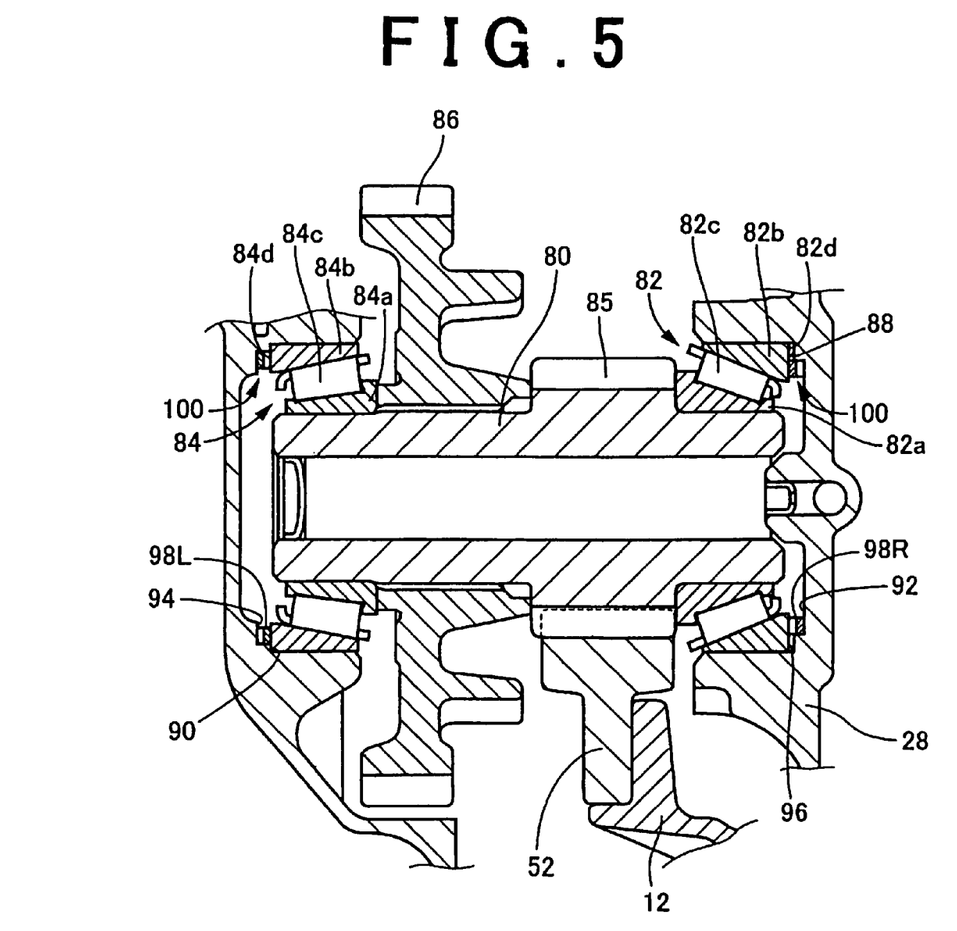
FIG. 5 is a sectional view showing a support structure for a counter shaft according to a fourth embodiment.

Next, a fourth embodiment of the invention will be described with reference to FIG. 5. FIG. 5 shows an example in which the invention is applied to a support structure for the counter shaft 80. The counter shaft 80 that is the rotation body is supported in the housing 28 at both sides of the counter shaft 80 in the axial direction so as to be rotatable with respect to the housing 28, by paired conical roller bearings 82 and 84. Each of the paired conical roller bearings 82 and 84 is provided on the outer side of the counter shaft 80. The conical roller bearing 82 includes an inner race 82a, an outer race 82b, and a conical roller 82c. The conical roller bearing 84 includes an inner race 84a, an outer race 84b, and a conical roller 84c. Each of the inner races 82a and 84a is fitted to an end portion of the counter shaft 80. Each of the outer races 82b and 84b is fitted in the housing 28. The conical roller 82c is provided between the inner race 82a and the outer race 82b. The conical roller 84c is provided between the inner race 84a and the outer race 84b.

The counter shaft 80 is integrally provided with the differential drive gear 85 that is engaged with the ring gear 52. The inner race 82a of the conical roller bearing 82 contacts one side surface of the differential drive gear 85, whereby the position of the inner race 82a in the axial direction with respect to the counter shaft 80 is decided. The other side surface of the differential drive gear 85 contacts one side surface of the counter driven gear 86 that is splined to the counter shaft 80. The other side surface of the counter driven gear 86 contacts a side surface of the inner race 84a of the conical roller bearing 84, whereby the position of the inner race 84a in the axial direction with respect to the counter shaft 80 is decided.

Stop surfaces 88 and 90 each of which has a ring shape are formed in the housing 28. The stop surface 88 stops movement of the outer race 82b by contacting an outer side surface 82d of the outer race 82b (i.e., a side surface opposite to the outer race 84b). The stop surface 90 stops movement of the outer race 84b by contacting an outer side surface 84d of the outer race 84b (i.e., a side surface opposite to the outer race 82b). In addition, ring concave portions 92 and 94 are formed in the housing 28. The ring concave portion 92 is adjacent to an inner peripheral side of the stop surface 88, and is recessed toward an outer side of the stop surface 88 in the axial direction (i.e., a side remote from the outer side surface 82d). The ring concave portion 94 is adjacent to an inner peripheral side of the stop surface 90, and is recessed toward an outer side of the stop surface 90 in the axial direction (i.e., a side remote from the outer side surface 84d). A distance between the paired stop surfaces 88 and 90 is slightly longer than a distance between the outer side surface 82d of the outer race 82b and the outer side surface 84d of the outer race 84b. Therefore, even while the stop surface 90 stops movement of the outer race on one side (the outer race 84b in FIG. 5) by contacting the outer side surface 84d of the outer race 84b, a clearance 96 is formed between the outer side surface 82d of the outer race 82b on the other side and the stop surface 88.

A wave spring 98R is housed in the ring concave portion 92. A wave spring 98L is housed in the ring concave portion 94. One end of the wave spring 98R in the axial direction contacts the outer side surface 82d of the outer race 82b. The wave spring 98R urges the outer race 82b toward the outer race 84b side. One end of the wave spring 98L in the axial direction contacts the outer side surface 84d of the outer race 84b. The wave spring 98L urges the outer race 84b toward the outer race 82b side. An axial length of the ring concave portion 92 is longer than an axial length of the wave spring 98R housed in the ring concave portion 92 when the wave spring 98R is completely contracted. An axial length of the ring concave portion 94 is longer than an axial length of the wave spring 98L when the wave spring 98L is completely contracted. Accordingly, in this embodiment, the stop surface 88 and the ring concave portion 92, or the stop surface 90 and the ring concave portion 94 constitute a stopper mechanism 100.

Each of the wave springs 94R and 94L used in this embodiment is formed by winding a wire once. However, the wave springs 94R and 94L have spring constants different from each other. Also, the outer races 82b and 84b are lightly pressed into the housing 28 such that when the temperature of the housing 28 is increased and the housing 28 is expanded while the vehicle is running, the outer races 82b and 84b are moved in the axial direction by the urging forces of the wave springs 98R and 98L, and the driving force transmitted to the counter shaft 80.

Figure 9:
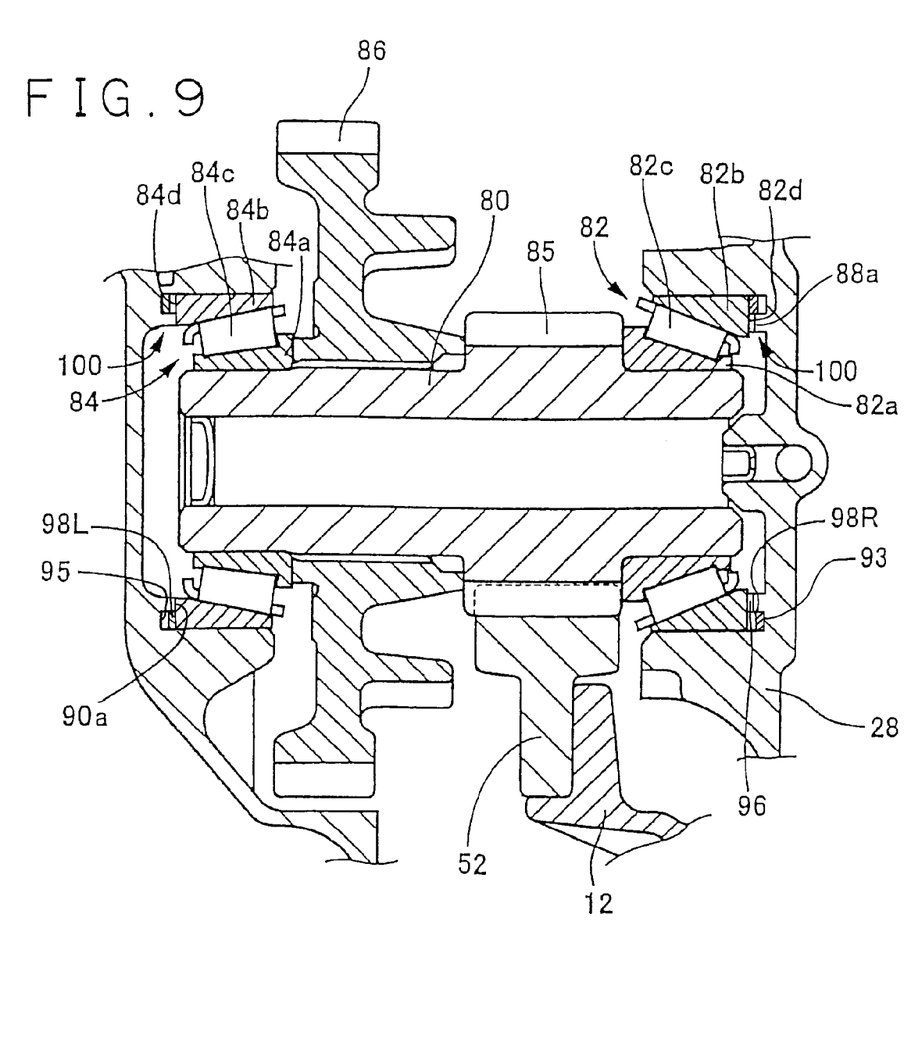
FIG. 9 is a sectional view showing a support structure for a counter shaft according to a variation of the fourth embodiment.

In another variant, illustrated in FIG. 9, ring concave portions 93 and 95 are formed in the housing 28. The ring concave portion 93 is adjacent to an outer peripheral side of the stop surface 88a, and is recessed toward an outer side of the stop surface 88a in the axial direction (i.e., a side remote from the outer side surface 82d). The ring concave portion 95 is adjacent to an outer peripheral side of the stop surface 90a, and is recessed toward an outer side of the stop surface 90a in the axial direction (i.e., a side remote from the outer side surface 84d).

In another variant, illustrated in FIG. 9, ring concave portions 93 and 95 are formed in the housing 28. The ring concave portion 93 is adjacent to an outer peripheral side of the stop surface 88a, and is recessed toward an outer side of the stop surface 88a in the axial direction (i.e., a side remote from the outer side surface 82d). The ring concave portion 95 is adjacent to an outer peripheral side of the stop surface 90a, and is recessed toward an outer side of the stop surface 90a in the axial direction (i.e., a side remote from the outer side surface 84d).

The fourth embodiment that has been described is different from the first embodiment in that the rotation body is the counter shaft 80. However, the support structure for the rotation body (that is, the counter shaft 80) has the same configuration as that in the first embodiment. Therefore, it is possible to obtain the same effects as those obtained in the first embodiment.

Although the embodiments of the invention have been described with reference to the drawings, the invention can be realized in other embodiments.

For example, although the conical roller bearings 26, 82, and 84 are used as the rolling bearing in the aforementioned embodiments, an angular ball bearing may be used instead.

Also, the invention can be applied to a differential device to which a driving force is transmitted from an automatic transmission by a hypoid gear pair that is widely used in front engine rear drive vehicles.

Also, in the first embodiment, the free lengths of the paired wave spring 42R and 42L on the right and left sides are made different from each other. Thus, the urging force of one of the wave springs 42R and 42L is made constantly larger than that of the other of the wave springs 42R and 42L, irrespective of displacement of the wave springs 42R and 42L. However, the urging force of one of the wave springs 42R and 42L may be made constantly larger than that of the other of the wave springs 42R and 42L by making the winding number of the wave springs 42R and 42L different from each other.

Also, in the case where the invention is applied to the support structure for the counter shaft 80 as in the fourth embodiment, the support ring whose hardness is higher than that of the housing 28 may be provided between the wave spring 98 and the housing 28, as in the second embodiment, or the stopper mechanism may be separated from the housing 28, and the stopper member 72 that functions as the stopper mechanism may be used, as in the third embodiment.

The aforementioned embodiment is an exemplary embodiment. The invention can be realized in other embodiments in which various changes and modifications are made based on knowledge of persons skilled in the art.

The support structure for a rotation body according to the invention can be applied to the differential device including the differential case which serves as the rotation body as in the first embodiment to the third embodiment, and to the support structure for the counter shaft as in the fourth embodiment.

Also, the support structure for a rotation body according to the invention can be applied to known various differential devices, such as a differential device using a helical gear pinion gear, and a differential device using plural pairs of pinion gears. Also, the differential device may have a limited slip differential function.

The wave spring is formed to have a coil shape and wave shape by winding a wire. The wave spring may be formed by winding a wire once, or twice or more. Since the wave spring is formed to have a coil shape by winding a wire, the wave spring has both end portions, unlike a wave spring formed by punching. The both end portions of the wave spring may be connected to each other. Also, plural wave springs may be stacked.

The wave spring may be directly provided between the housing and the outer race. Also, the protection member may be provided between the housing and the wave spring so that the wave spring is indirectly provided between the housing and the outer race, as in the second embodiment or the third embodiment.

In the above-mentioned embodiments, the wave spring and the stopper mechanism are provided in each of the both end portions of the rotation body in the axial direction. However, even in the case where the wave spring and the stopper mechanism are provided on only one side, it is possible to obtain a certain effect. Also, in the case where the wave spring and the stopper mechanism are provided in each of the both end portions of the rotation body in the axial direction, two wave springs having the same spring constant and the same free length may be used. Also, as in the aforementioned embodiments, the two wave springs may be different in at least one of the spring constant and the free length.

What is claimed is:

1. A support structure for a rotation body comprising:
   a rotation body;
   a housing in which the rotation body is housed;
   a bearing by which the rotation body is supported in the housing so as to be rotatable around an axis of the housing, and which includes an outer race, an inner race, and plural rolling elements provided between the outer race and the inner race;
   a wave spring which is provided between the outer race and the housing, and which has a predetermined elastic force; and
   a stopper mechanism which stops movement of the outer race in an axial direction by contacting the outer race before the wave spring is completely contracted due to movement of the outer race in the axial direction, wherein
   the wave spring is a first wave spring and the bearing is a first bearing that supports a first end of the rotation body in the axial direction, the first wave spring is provided between the first bearing and the housing, and a second wave spring is provided between a second bearing that supports a second end of the rotation body in the axial direction and the housing,
   the stopper mechanism is a first stopper mechanism provided for the first wave spring, a second stopper mechanism is provided for the second wave spring, and the second stopper mechanism stops movement of an outer race of the second bearing by contacting the outer race of the second bearing before the second wave spring is completely contracted due to movement of the outer race of the second bearing in the axial direction of the rotation body,
   the first and second wave springs are different from each other in at least one of a spring constant and a free length, and
   the first and second wave springs and the first and second stopper mechanisms are positioned such that the first stopper mechanism stops movement of the outer race of the first bearing by contacting the outer race of the first bearing while a driving force is not being transmitted to the rotation body.

2. The support structure for a rotation body according to claim 1, wherein
   the housing includes a stop surface which stops movement of the outer race by contacting a side surface of the outer race, and a ring concave portion which is provided on an outer peripheral side or on an inner peripheral side of the stop surface, and in which the wave spring is housed, the stop surface and the ring concave portion serving as the stopper mechanism; and
   the stop surface is formed at such a position that an axis length from an end portion of the wave spring that contacts the housing in the axial direction to the stop surface is longer than a length of the wave spring when the wave spring is completely contracted.

3. The support structure for a rotation body according to claim 1, wherein
   the housing includes a stop surface which stops movement of the outer race by contacting a side surface of the outer race, and a ring concave portion which is provided on an outer peripheral side or on an inner peripheral side of the stop surface, and in which the wave spring is housed, the stop surface and the ring concave portion serving as the stopper mechanism; and
   the stop surface is formed at such a position that an axis length from a side surface of the ring concave portion on which an end portion of the wave spring contacts in the axial direction to the stop surface is longer than a length of the wave spring when the wave spring is completely contracted.

4. The support structure for a rotation body according to claim 1, further comprising:
   a protection member which is provided between the housing and an end portion of the wave spring that contacts the housing in the axial direction, and the protection member has a hardness that is higher than that of the housing.

5. The support structure for a rotation body according to claim 1, wherein
   the support structure includes a stopper member made of a material with a hardness that is higher than that of the housing, the stopper member serving as the stopper mechanism; and
   the stopper member includes a stop surface which stops movement of the outer race by contacting a side surface of the outer race, and a ring concave portion which is provided on an outer peripheral side or on an inner peripheral side of the stop surface, in which the wave spring is housed, and whose axial length is longer than a length of the wave spring when the wave spring is completely contracted.

6. The support structure for a rotation body according to claim 1, wherein
   the outer race of the second bearing is fitted into the housing such that the outer race of the second bearing is not moved by an urging force of the wave spring prior to operation of the rotation body, and when a temperature of the housing is increased during operation of the rotation body, the outer race of the second bearing is moved with respect to the housing by the urging force of the wave spring.

7. The support structure for a rotation body according to claim 1, wherein the rotation body is a differential case.

8. The support structure for a rotation body according to claim 1, wherein the rotation body is a counter shaft.

9. A support structure for a rotation body comprising:
a rotation body;
a housing in which the rotation body is housed;
a first bearing;
a second bearing, wherein the first bearing and the second bearing cooperatively support the rotation body in the housing so as to be rotatable around an axis of the housing, the first bearing and the second bearing each including an outer race, an inner race, and plural rolling elements provided between the outer race and the inner race;
a first wave spring that is provided between the outer race of the first bearing and the housing, the first wave spring having a first predetermined elastic force;
a second wave spring that is provided between the outer race of the second bearing and the housing, the second wave spring having a second predetermined elastic force;
a first stopper mechanism which stops movement of the outer race of the first bearing in a first axial direction by contacting the outer race of the first bearing before the first wave spring is completely contracted due to movement of the outer race of the first bearing in the first axial direction; and
a second stopper mechanism which stops movement of the outer race of the second bearing in a second axial direction by contacting the outer race of the second bearing before the second wave spring is completely contracted due to movement of the outer race of the second bearing in the second axial direction,
wherein the first predetermined elastic force of the first wave spring is greater than the second predetermined elastic force of the second wave spring such that a first urging force of the first wave spring is set so as to be constantly larger than a second urging force of the second wave spring.

10. The support structure for a rotation body according to claim 9, wherein the first bearing and the second bearing are arranged in the housing such that a clearance is formed between the first stopper mechanism and the outer race of the first bearing when the second stopper mechanism contacts the outer race of the second bearing, and the clearance is formed between the second stopper mechanism and the outer race of the second bearing when the first stopper mechanism contacts the outer race of the first bearing.

11. The support structure for a rotation body according to claim 10, wherein the first bearing and the second bearing are arranged in the housing such that neither the outer race of the first bearing nor the outer race of the second bearing are moved in the first or second axial directions by urging forces of the first or second wave springs when the housing is at a first temperature and a driving force is not transmitted to the housing, and
wherein the first bearing and the second bearing are arranged in the housing such that the first wave spring urges the outer race of the second bearing so as to move in the second axial direction to make direct contact with the second stopper mechanism when the housing is at a second temperature greater than the first temperature and the driving force is not transmitted to the housing.

* * * * *